Jan. 26, 1960     K. H. SCHULTZE     2,922,413
TRUING DEVICE FOR PROFILE GRINDING WHEELS
Filed June 8, 1959     5 Sheets-Sheet 1
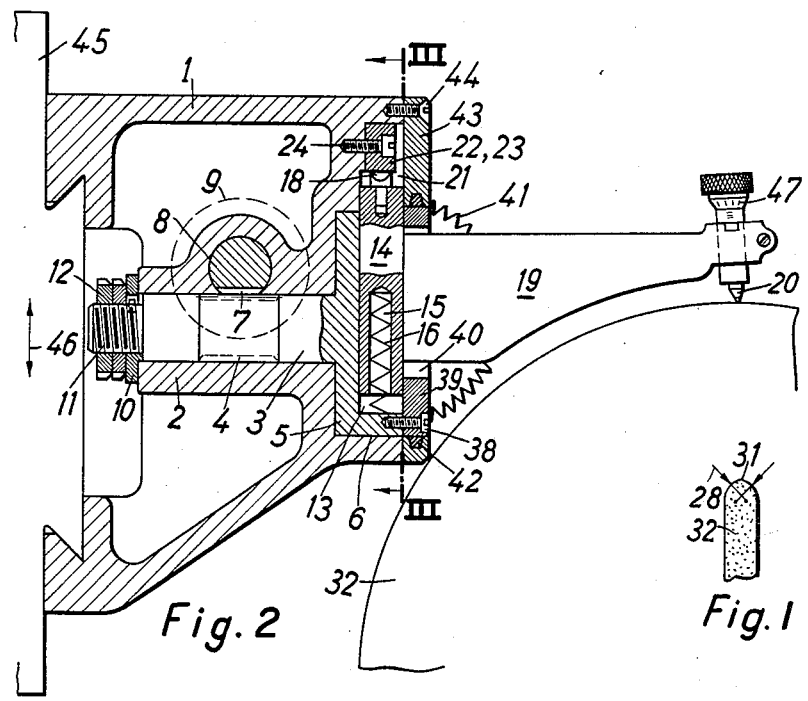
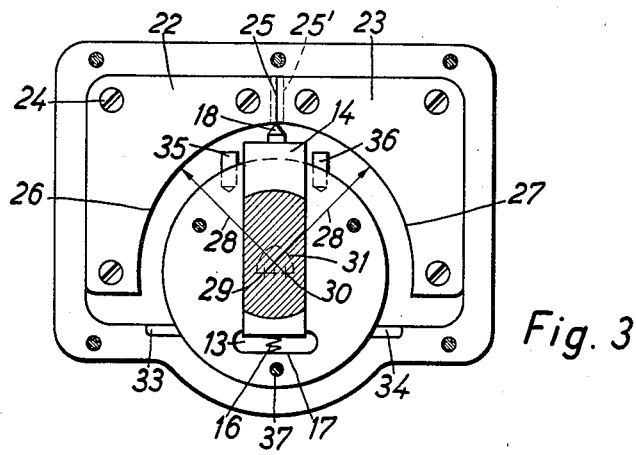
Inventor:
Kurt H. Schultze
ATTORNEY Inventor:
Kurt H. Schultze Jan. 26, 1960          K. H. SCHULTZE          2,922,413
TRUING DEVICE FOR PROFILE GRINDING WHEELS Filed June 8, 1959          5 Sheets-Sheet 4

Inventor:
Kurt H. Schultze
ATTORNEY

United States Patent Office 2,922,413
Patented Jan. 26, 1960

2,922,413

TRUING DEVICE FOR PROFILE GRINDING WHEELS

Kurt H. Schultze, Berlin-Frohnau, Germany, assignor to Herbert Lindner G.m.b.H., Berlin, Germany, a corporation of Germany Application June 8, 1959, Serial No. 818,907

Claims priority, application Germany July 19, 1958

9 Claims. (Cl. 125—11)

My invention relates to truing devices for profile grinding wheels and more particularly to devices for truing pointed arch profiles on such wheels. Such grinding wheels are being used, for example, to grind helical grooves in ball rotary systems in which the balls contact said grooves not along circumferential lines but at points.

Truing devices for said purposes are known which work with jigs or templets that are either rectilinear or are mounted on a rotating drum and which execute a rectilinear primary motion in parallel to the axis of the grinding wheel, the resulting motion producing the desired profile thereupon. Said truing devices require a cutting diamond which grinds one flank of the profile with one of its sides and the other flank of the profile with the other of its sides; thus said cutting tool works with two distinct cutting edges which often wear out differently and thus produce asymmetrical profiles. The precision work is further impaired in view of the fact that in said devices the truing tool remains always in a position parallel to the symmetry axis of the profile to be formed. Thus these form-truing devices are applicable only under certain conditions.

It is an object of my invention to avoid the said disadvantages in the manufacture of grinding wheels having a pointed arch profile and to provide a truing device which will work precisely, reliably and economically and which will operate with a template that can be cheaply and easily manufactured and quickly and simply exchanged.

According to my invention the supporting arm for the truing tool, for example a diamond, is connected to a sliding member which is mounted in a swivel member such as the head of a swivel shaft and is displaceable thereupon diametrically thereof in a plane vertical to the axis of said swivel shaft, said carriage being operatively connected with a spring loaded contacting or feeling member or follower which is guided by a pattern or templet causing said slide member and the tool supporting arm connected therewith to move transversely to the rotational axis of the swivel member. Thus in my new device the truing tool such as a diamond will stand at all times in a substantially vertical position relative to the operated on profile surface of the grinding wheel and the same cutting edge of said tool will dress both flanks thereof thus permitting the use of an ordinary raw diamond.

The said patterns or templets used to produce the desired pointed arch profile may consist of two complementary components being adjustably held in the casing of the device preferably behind a removable cover and each having a circular guide surface extending over less than 90°.

The said and other objects of my invention will be more fully understood from the following specification when read with the accompanying drawing in which two embodiments of my new device are illustrated. In the drawing Fig. 1 shows a section through a portion of a grinding wheel having a pointed arch profile;

Fig. 2 is a sectional view of one embodiment of my invention;

Fig. 3 is a cross sectional view thereof along line III—III of Fig. 2;

Figures 4, 5:
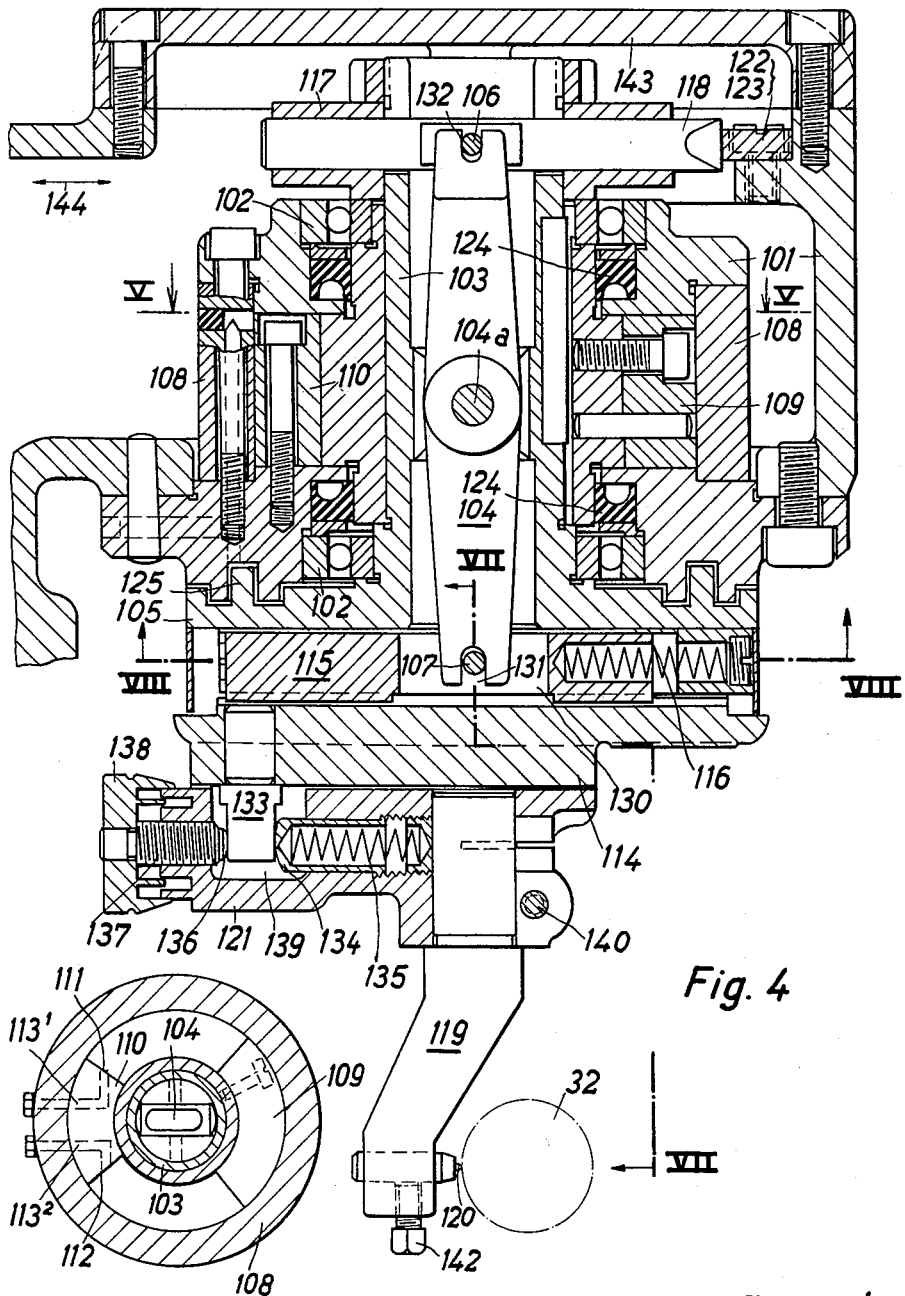
Fig. 4 is a sectional view of another embodiment of my invention.
Fig. 5 is a cross sectional view thereof along line V—V of Fig. 4.
Figure 6:
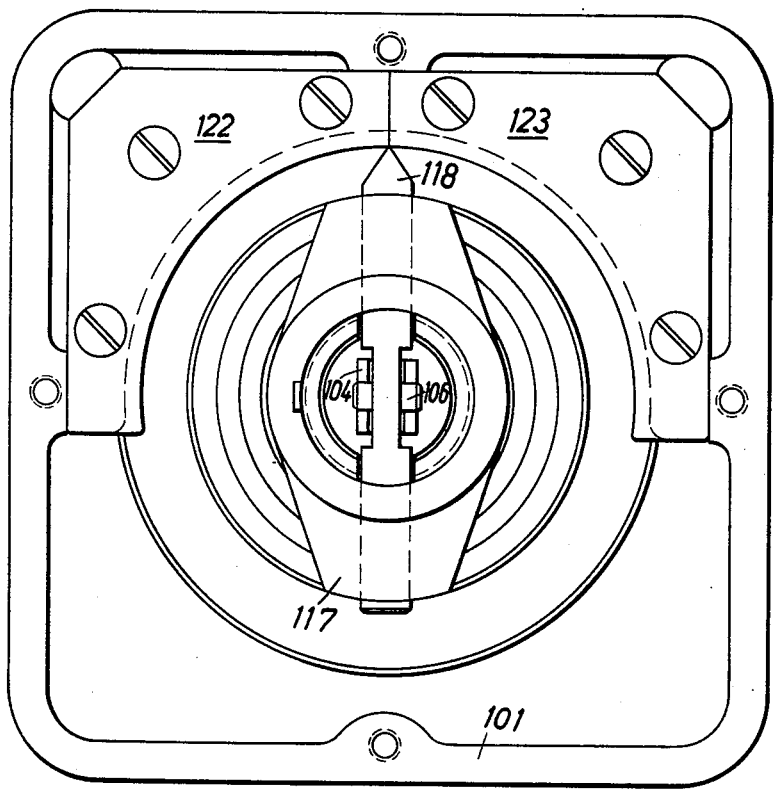
Fig. 6 is a top view in the direction of arrow VI in Fig. 4 after the cover has been removed.

The embodiment illustrated in Figs. 2 and 3 comprises a casing 1 including a bushing 2 rotatably holding a swivel shaft 3 which is provided approximately in its central portion with a circumferential pinion-like toothing 4. The right end of said shaft 3 is attached to or integral with a cylindrical swivel head 5 which rests rotatably in a cylindrical recess 6 of the casing 1. A driving rod 8 is slidably mounted in the casing 1 transversely to said shaft 3 and is provided with a racklike toothing 7 engaging the said pinion-like toothing 4 of said shaft. One end or each end of said rod 8 are attached to driving means such as a reciprocable piston 9 within a not shown cylinder to displace said rod 8 in both directions. The said driving means are either arranged within the casing 1 or connected thereto. The swivel shaft 3 is secured against axial displacement in the bushing 2 by a retaining ring 10 which is seated upon the threaded lug 11 and held by the nuts 12.

The swivel head 5 is provided with a guide recess 13 which extends therein substantially diametrically and which guides a sliding member 14. This member 14 houses within a boring 15 a pressure spring 16 which abuts with its outer end against the base wall of said recess 13. Opposite to said spring 16 upon said sliding member 14 is a feeler or follower such as a contacting edge 18 as shown or a contacting roller. Integral with or attached to said sliding member 14 is the supporting arm 19 for the truing diamond 20 which operates upon the grinding wheel 32. Within a chamber 21 provided in the casing 1 and extending above and partially around the forward portion of the swivel head 5 is a pair of templets 22, 23 which are attached to the casing 1 by screws 24. The said two templets contact each other at 25 and complement each other to form the pattern for the desired pointed arch profile of the grinding wheel 32 as shown in Fig. 1. The interior faces 26 and 27 of said templets 22, 23 respectively, are arc-shaped; they have the same radius 28 but spaced center points 29, 30, respectively. The size of such spacing of the said center points will depend, as will be well understood, from the location of the abutting faces 25 which for example may be located as indicated by the dotted line 25' thus reducing the arc of the templets to less than 90° in conformity with the desired profile 31 of the grinding wheel. The rotational displacement of the swivel head 5 is limited by stationary stops 33, 34 in the casing 1 and the cooperating counter-stops 35, 36 on the swivel head 5.

A cover ring 39, which overlaps the sliding member 14 and thus secures the same in the guide recess 13 of the swivel head 5, is attached to the swivel head 5 by screws 38, for example three, which engage the threaded holes 37 in said swivel head. The inner opening 40 of said ring 39 permits the supporting arm 19 to pass freely therethrough. To prevent any impurities to enter from outside through said opening 40 the same is covered by a bellows 41 which is attached to the ring 39 and to the arm 19, respectively. Said ring 39 is seated in the cover plate 43 of the casing 1 and is tightened therein by a packing 42. The cover plate 43 which is removably attached to the casing 1 by screws 44, protects the templets 22, 23 and permits to exchange the same without necessitating a removal of the device from the feed slide 45 which is displaceable as indicated by the double arrow 46. The truing diamond 20 mounted in the free end of the arm 19 may be adjusted relative to the grinding wheel 32 by means of micrometrical screw 47.

Another embodiment of my invention is illustrated in Figs. 4 to 8. The hollow swivel shaft 103 which is provided with a swivel head 105 is rotatably mounted in roller bearings 102 within the casing 101. The sliding member 114 is provided with a slide block 115 which is displaceable in the swivel head 105 between the guide ledges 126, 127 and the intermediate rollers 128, 128. The slide block 115 contains within a boring a pressure spring 116 which abuts with its outer end against a wall integral with or connected to the casing 101 and which tends to move said slide block 115 from right to left.

The two-arm lever 104 is rotatably mounted upon the pin 104a within the hollow swivel shaft 103. Each end of said lever 104 is provided with an open slot 131, 132 respectively. The slot 131 embraces a pin 107 mounted in an opening 130 of the slide block 115 and the slot 132 embraces a pin 106 attached to the contacting member or feeler 118 which is slidably resting in a guide piece 117 connected to the swivel shaft 103. The said contacting member or feeler 118 cooperates with the stationary templets 122, 123 (similarly as the contact member 18 in the first described embodiment with the templets 22, 23) and the movements of said follower 118 are transferred by means of the double-arm lever 104 to the slide block 115 and sliding member 114, to which the supporting arm 119 for the truing diamond is attached by means of an auxiliary adjusting slide 121 which will be more fully described hereinafter.

The rotation of the hollow swivel shaft 103 is effected by a rotary piston 109 which moves within the cylinder 108 and whose movement therein is limited by the guard block 110 the faces 111 and 112 of which contact the respective side faces of the piston 109 in its end positions. Two bore holes $113^1$, $113^2$ passing through the cylinder wall and the guard block 110 serve alternately as inlet and outlet for a pressure medium from a source not shown in the drawing and permit such pressure medium to enter the cylinder space on one or the other side of the piston 109 to displace the same and thus to turn the swivel shaft 103 in one or the other direction. The cylinder space is sealed from the ball bearing 102 by the ring gasket 124. A labyrinth seal 125 is arranged between the swivel head 105 and the casing 101. The casing is closed by a removable cover 143.

Figure 7:
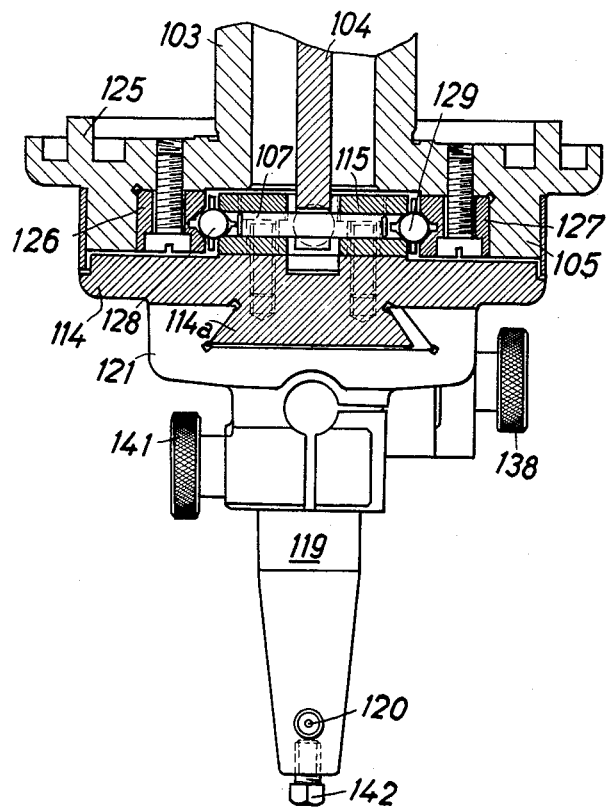
Fig. 7 shows a sectional view along line VII—VII of Fig. 4.
Figure 8:
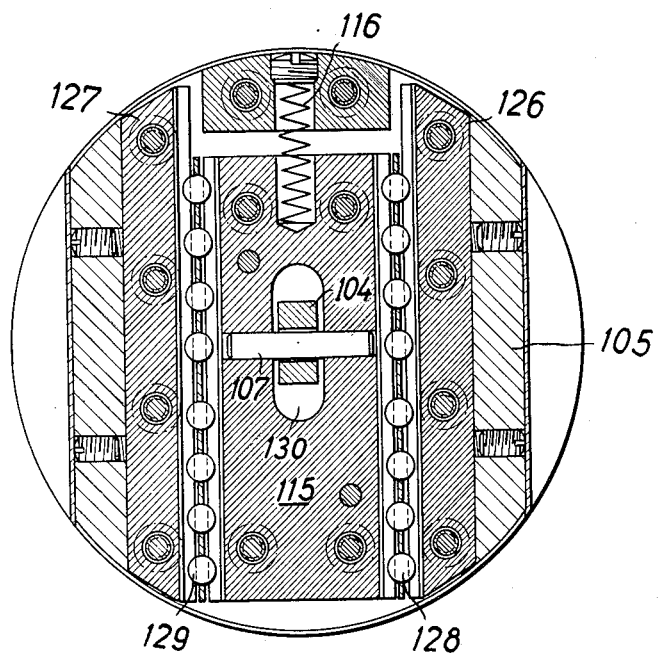
Fig. 8 shows a sectional view along line VIII—VIII of Fig. 4.

The sliding member 114 is provided on its bottom face with a dovetailed guide 114a for the auxiliary adjusting slide 121 mentioned above (Fig. 7). This dovetailed guide 114a is parallel to the guide ledges 126, 127 for the slide block 115. The displacement of the slide 121 relative to the carriage 114 is effected by the driver bolt or tappet 133 (Fig. 4). This bolt 133 is firmly mounted in the sliding member 114 and extends between a sleeve 134, which is slidably mounted in the slide 121 and is acted upon by a pressure spring 135 mounted therein, and the face 136 of a micrometrical spindle 137 which may be adjusted by the spindle head 138. The said spindle 137, sleeve 134 and bolt 133 are located within the slide 121 in a recess 139 thereof which is sufficiently wide to permit the required adjustment of the slide 121 relative to the sliding member 114. The supporting arm 119 is removably attached to the slide 121 by means of a clamping screw 140 having an actuating head 141 (Figs. 4 and 7). The truing diamond 120 is attached to the bearing arm by the screw 142.

The device is mounted upon a not shown feed slide such as feed slide 45 shown in Fig. 2 which is movable in horizontal direction as indicated by the double arrow 144.

While two specific embodiments of my invention have been shown and described in detail to illustrate the application of the principles of my invention, it will be well understood that my invention may be otherwise embodied without departing from such principles.

What I claim as my invention is:

1. A truing device for grinding wheels having a pointed-arch shaped profile, comprising in combination a casing; a swivel member mounted in said casing for limited rotational displacement in both directions; driving means to effect such rotational displacements; a supporting arm for the truing tool extending substantially in the direction of the rotational axis of the swivel member; holding means for the truing tool located at the free end of said arm and holding said tool in a position substantially vertical to the rotational axis of the swivel member; a sliding member connected to the other end of said arm; guiding means in said swivel member to guide said sliding member diametrically thereupon; a feeler or follower operatively connected with the sliding member; a templet mounted in the casing and having a pointed-arch shaped guide face for cooperation with said feeler or follower; and resilient means pressing said feeler or follower against said guide face.

2. A truing device for grinding wheels having a pointed-arch shaped profile, comprising in combination a casing; a swivel shaft mounted in said casing for limited rotational displacement in both directions; driving means to effect such rotational displacements; a rotational swivel head on one end of said shaft; a supporting arm for the truing tool extending substantially in the direction of the rotational axis of the swivel shaft; holding means for the truing tool located at the free end of said arm and holding said tool in a position substantially vertical to the rotational axis of the swivel shaft; a sliding member connected to the other end of said arm; guiding means in said swivel head adapted to guide said sliding member diametrically thereupon; a feeler or follower operatively connected with the sliding member; a templet mounted in the casing and having a pointed-arch shaped guide face for cooperation with said feeler or follower; and resilient means pressing said feeler or follower against said guide face.

3. A truing device for grinding wheels having a pointed-arch shaped profile, comprising in combination a casing; a swivel shaft mounted in said casing for limited rotational displacement in both directions; driving means to effect such rotational displacements; a rotational swivel head on one end of said shaft; a supporting arm for the truing tool extending substantially in the direction of the rotational axis of the swivel shaft; holding means for the truing tool located at the free end of said arm and holding said tool in a position substantially vertical to the rotational axis of the swivel shaft; a sliding member connected to the other end of said arm; guiding means in said swivel head adapted to guide said sliding member diametrically thereupon; a feeler or follower mounted on said sliding member and extending therefrom in the direction of the sliding movement; a templet mounted in the casing and having a pointed-arch shaped guide face for cooperation with said feeler or follower; and resilient means acting upon said sliding member and pressing said feeler or follower against said guide face.

4. A truing device for grinding wheels having a pointed-arch shaped profile, comprising in combination a casing; a hollow swivel shaft mounted in said casing for limited rotational displacement in both directions; driving means to effect such rotational displacements; a rotational swivel head on one end of said shaft; a supporting arm for the truing tool extending substantially in the direction of the rotational axis of the swivel shaft; holding means for the truing tool located at the free end of said arm and holding said tool in a position substantially vertical to the rotational axis of the swivel shaft; a sliding member connected to the other end of said arm; guiding means on the swivel head adapted to guide said sliding member diametrically thereupon; a feeler or follower slidably mounted in the other end of the swivel shaft for displacement in parallel to that of a sliding member; a double arm lever mounted within said hollow swivel shaft; one lever arm operatively connected to said sliding member and the other lever arm operatively connected to said feeler; a templet mounted in the casing and having a pointed-arch shaped guide face for cooperation with said feeler or follower; and resilient means pressing said feeler or follower against said guide face.

5. A truing device for grinding wheels according to claim 1 wherein the templet is composed of two mutually adjustable components.

6. A truing device for grinding wheels according to claim 1 wherein the said driving means comprise a pinion-like circumferential toothing on the swivel member and a racklike driving rod engaging said toothing.

7. A truing device for grinding wheels according to claim 1 wherein the said driving means comprise a rotary piston connected with the swivel member, a cylinder for said piston coaxial with said swivel member, and a stationary guard block, in said cylinder to limit the rotational movement of the piston.

8. A truing device for grinding wheels according to claim 1 wherein the said grinding means comprise a guide block attached to the sliding member, guide ledges mounted in the swivel member and guide roller intermediate thereof.

9. A truing device for grinding wheels according to claim 1 and comprising an auxiliary adjusting slide intermediately connecting the supporting arm to the sliding member.

References Cited in the file of this patent

UNITED STATES PATENTS 2,345,323    Bullows ---------------- Mar. 28, 1944

FOREIGN PATENTS 389,762    Great Britain ---------- Mar. 23, 1933
604,799    Germany -------------- Oct. 29, 1934